United States Patent [19]

Butler

[11] Patent Number: 4,536,611
[45] Date of Patent: Aug. 20, 1985

[54] UNITARY TELEPHONE CABLE CLOSURE

[76] Inventor: David O. Butler, 1306 Vermont Ave., Tarpon Springs, Fla. 33589

[21] Appl. No.: 706,860

[22] Filed: Feb. 28, 1985

Related U.S. Application Data

[63] Continuation-in-part of Ser. No. 623,495, Jun. 22, 1984.

[51] Int. Cl.³ .................... H02G 15/113; H02G 7/08; H01R 9/00
[52] U.S. Cl. ......................................... 174/41; 174/59
[58] Field of Search .................. 174/41, 59, 60, 68 C, 174/72 A, 92, DIG. 11; 24/543, 575, 576, 578, 587, 704; 138/107, 128, 162, 166, 168; 248/61

[56] References Cited

U.S. PATENT DOCUMENTS

| | | | |
|---|---|---|---|
| 2,558,367 | 6/1951 | Madsen | 24/576 |
| 2,683,304 | 7/1954 | Channell | 174/41 X |
| 2,891,101 | 6/1959 | Koliss | 174/92 X |
| 3,517,702 | 6/1970 | Mueller et al. | 138/168 X |
| 3,715,459 | 2/1973 | Hoffman | 174/92 X |
| 3,836,696 | 9/1974 | Gressitt et al. | 174/41 |
| 4,015,072 | 3/1977 | Gillemot | 174/92 |
| 4,128,918 | 12/1978 | Wenk | 24/543 X |
| 4,486,620 | 12/1984 | Ball et al. | 174/41 |
| 4,513,171 | 4/1985 | Suffi et al. | 174/41 |

FOREIGN PATENT DOCUMENTS

| | | | |
|---|---|---|---|
| 225770 | 2/1963 | Austria | 174/92 |
| 984179 | 2/1965 | United Kingdom | 174/92 |

Primary Examiner—Laramie E. Askin

[57] ABSTRACT

An aerial telephone cable closure for enclosing telephone cables suspended from a support strand. The closure consists of a tubular housing having a pair of interfitting mating edges, these edges are fastened after passing the telephone cable through the access slot between the edges. The closure further includes flexible metal hanger brackets which are attached to the outside upper circumferential surface of the closure and which each have a vertical portion projecting upward for the fastening to the aerial support strand by support strand clamps. When it is desired to terminate some of the conductors in the cable for use with telephone service wires, the closure would include a termination port formed in the side of the tubular housing. The termination port includes a rectangular frame formed about a rectangular opening in one side of the tubular housing. A replaceable terminal block panel assembly is installed within the rectangular frame. The replaceable terminal block assembly is comprised of a terminal block panel on which a terminal block is mounted. A rectangular lid is integrally hinged on the top side of the frame for providing access to the terminal block. In this manner, the closure can be fastened about the cable and access can be had to terminate service wires to the terminal block.

10 Claims, 12 Drawing Figures

UNITARY TELEPHONE CABLE CLOSURE

CROSS-REFERENCE TO RELATED APPLICATIONS:

This application is a continuation-in-part of application Ser. No. 623,495 filed June 22, 1984. It is related to the application Ser. No. 597,673 filed Apr. 6, 1984. It is also related to the application Ser. No. 614,313 filed May 25, 1984.

FIELD OF THE INVENTION

This invention relates to telephone cable closures and specifically to an improved telephone cable closure.

BACKGROUND OF THE INVENTION

The telephone industry uses a wide assortment of aerial terminal and splice closures, for the enclosing and termination of telephone cables. Most of these come in an assortment of parts to assemble; many also have the need for special tools for their installation and are normally quite time consuming to install. Such prior art splice cases and enclosures often fail to maintain a reliable barrier against rain water, moisture, insects, and sunlight, whose ultra-violet light can rapidly deteriorate poorly enclosed cable openings. Another critical problem associated with the prior art closures is the necessity to maintain them secure against unauthorized entry. Conventional enclosures are too easy to gain unauthorized entry into. Examples of such prior art enclosures are found in U.S. Pat. Nos. 3,846,575; 3,517,702 and 2,198,415 and also in British Pat. 984,179. Other prior art showing related structures which also fail to solve the above stated problems include U.S. Pat. Nos. 4,391,303; 4,372,011; 4,073,090; 3,654,049; 3,529,795; 3,226,787; and 2,023,433.

OBJECTS OF THE INVENTION

It is therefore an object of the invention to provide an improved enclosure for the encapsulation of cable splices.

It is a further object of the invention to provide an improved enclosure for the encapsulation of cable splices which is easier to seal than has been available in the prior art.

It is still a further object of the invention to provide an improved enclosure for the encapsulation of cable splices which is more impervious to rain water, ultra-violet light and insects than has been available in the prior art.

It is yet a further object of the invention to provide an improved enclosure for the encapsulation of cable splices which is more secure against unauthorized entry than has been available in the prior art.

SUMMARY OF THE INVENTION

These and other objects, features and advantages of the invention are accomplished by the unitary telephone cable closure invention disclosed herein. A unitary telephone cable closure is disclosed, for enclosing a communications cable suspended from a support strand. The closure includes a hollow, flexible wall, tubular housing having a pair of longitudinal mating edges separated by a longitudinal access slot, the edges being fastened together in mating engagement after passing the cable through the slot. The closure further includes flexible metal hanger brackets which are attached to the outside upper circumferential surface of the closure and which each have a vertical portion projecting upward for the fastening to a support strand by support strand clamps. When it is desired to terminate some of the conductors in the cable for use with telephone service wires, the closure would include a termination port formed in the side of the tubular housing. The termination port includes a rectangular frame formed about a rectangular opening in one side of the tubular housing. A replaceable terminal block panel assembly is installed within the rectangular frame. The replaceable terminal block assembly is comprised of a terminal block panel on which a terminal block is mounted. A rectangular lid is integrally hinged on the top side of the frame for providing access to the terminal block. In this manner, the closure can be fastened about the cable and access can be had to terminate service wires to the terminal block. In one embodiment, the tubular housing includes a first longitudinal edge of the pair including a first hook portion projecting circumferentially from the wall and having an upwardly projecting barb, an upper guard portion projecting from the wall and extending above the barb of the hook portion, and a first lower guard portion projecting from the wall and extending below the hook portion. A second longitudinal edge of the pair includes a second hook portion projecting circumferentially from the wall and having a downwardly projecting barb and a second lower guard portion projecting from the wall and extending below the second hook portion. The second hook portion of the second edge is disposed for mating engagement between the upper guard and the first hook portion of the first edge and the second lower guard portion of the second edge is disposed for engagement between the first hook portion and the first lower guard portion of the first edge. In this manner, the first and second hook portions are protected by both the first and the second lower guard portions. The resultant unitary telephone cable closure invention provides an improved enclosure for the encapsulation of cable splices which is easier to seal than has been available in the prior art. The invention is more impervious to rain water, ultra-violet light and insects than has been available in the prior art. In addition, the invention is more secure against unauthorized entry than has been available in the prior art.

DESCRIPTION OF THE FIGURES

These and other objects, features and advantages of the invention will be more fully appreciated with reference to the accompanying figures.

DISCUSSION OF THE PREFERRED EMBODIMENTS

Figure 1:
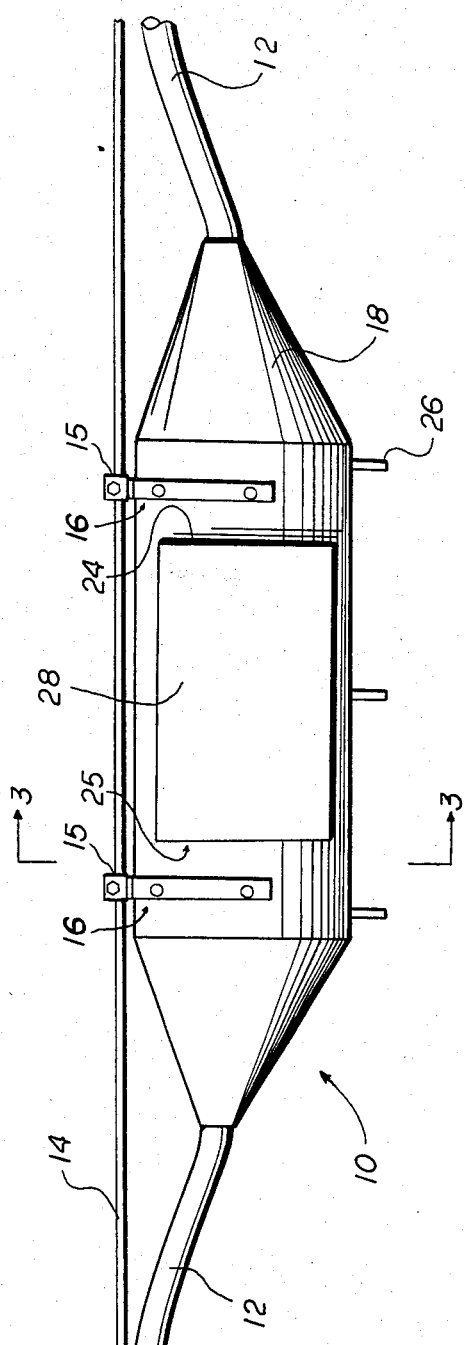
FIG. 1 is a side view of the unitary telephone cable closure invention with a terminal lid in the closed position.
Figure 5:
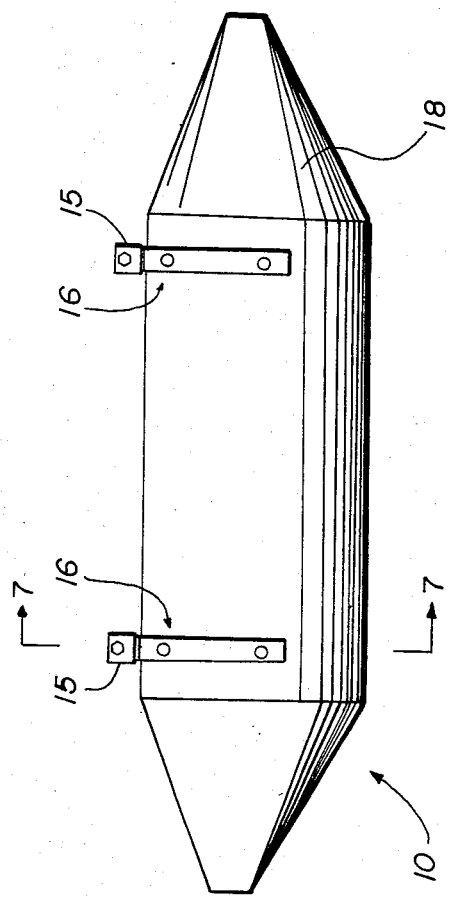
FIG. 5 is a side view of the unitary telephone cable closure invention.
Figure 6:
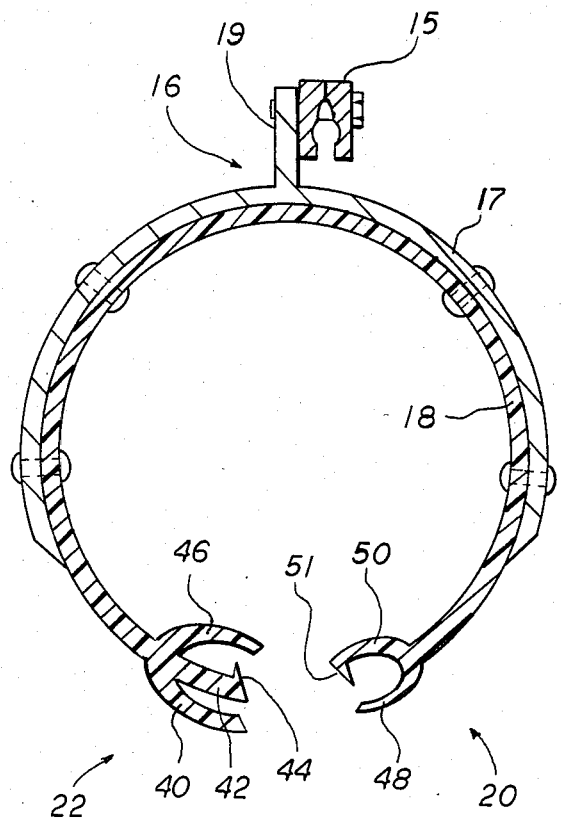
FIG. 6 is a cross sectional view of the closure as a hooked snap lock, in its open state.

The unitary telephone cable closure 10 with terminal port 25 is shown in FIG. 1, for enclosing a communications cable 12 suspended from a support strand 14. The closure 10 includes a hollow, flexible wall, tubular housing 18 shown to better advantage in FIGS. 5, 6 and 7, having a pair of longitudinal mating edges 20 and 22 separated by a longitudinal access slot. The edges 20 and 22 can be fastened together in mating engagement after passing the cable 12 through the slot. The edges 20 and 22 extend along the entire length of the bottom of the housing 18.

The closure 10 further includes metal hanger brackets 16 each having a lower flexible portion 17, fastened to the outside upper surface of the tubular housing 18, and each having a vertical portion 19 projecting upward, for the fastening to support strand 14, by support strand clamps 15. The tubular housing 18 can be approximately 0.125 inch thick and can be formed from a flexible plastic. It is the flexibility of the tubular housing 18 which enables the easy enclosing around a cable 12 which is suspended from an aerial strand 14.

Figure 7:
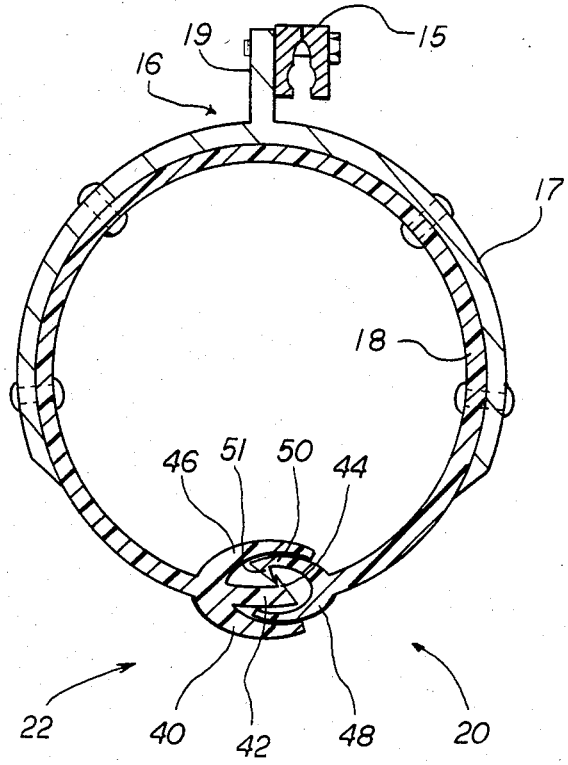
FIG. 7 is a cross sectional view along the section line 7—7 of FIG. 5, showing the first embodiment of the closure as a hooked snap lock, in its closed state.

The first embodiment of the invention is shown in FIG. 7, which provides an impervious, tamper-resistant seal for the tubular housing 18. The tubular housing 18 includes the hooked permanent snap lock in which the first longitudinal edge 22 of the pair includes a first hook portion 42 projecting circumferentially from the wall 18 and having an upwardly projecting barb 44. An upper guard portion 46 projects from the wall 18 and extends above the barb 44 of the hook portion 42. A first lower guard portion 40 projects from the wall 18 and extends below the hook portion 42.

The second longitudinal edge 20 of the pair includes a second hook portion 50 projecting circumferentially from the wall 18 having a downwardly projecting barb 51 and a second lower guard portion 48 projecting from the wall 18 and extending below the second hook portion 50.

The second hook portion 50 of the second edge 20 is disposed for mating engagement between the upper guard portion 46 and the first hook portion 42 of the first edge 22, and the second lower guard portion 48 of the second edge 20 is disposed for mating engagement between the first hook portion 42 and the first lower guard portion 40 of the first edge 22.

In this manner, the first and second hook portions 42 and 50 are protected by both the first and the second lower guard portions 40 and 48, respectively.

Figure 8:
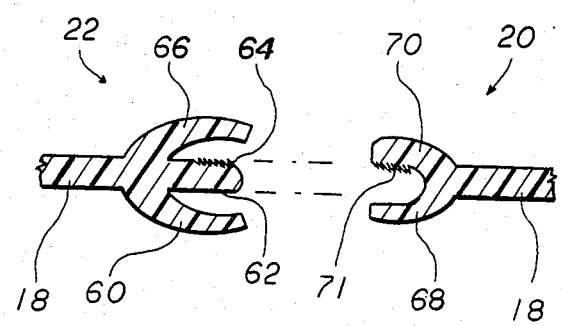
FIG. 8 is a view similar to that in FIG. 6, showing the second embodiment of the closure as a saw tooth snap lock.

The second embodiment of the invention, which features the saw tooth permanent snap lock, is shown in FIG. 8. This embodiment provides another impervious, tamperproof seal for the tubular housing. The first longitudinal edge 22 of the pair includes a first saw tooth portion 62 projecting circumferentially from the wall 18 and having an upwardly projecting serrated surface 64, an upper guard portion 66 projecting from the wall 18 and extending above the serrated surface 64 of the saw tooth portion 62, and a first lower guard portion 60 projecting from the wall 18 and extending below the saw tooth portion 62.

FIG. 8 shows the second longitudinal edge 20 of the pair including a second saw tooth portion 70 projecting circumferentially from the wall 18 and having a downwardly projecting serrated surface 71 and a second lower guard portion 68 projecting from the wall 18 and extending below the second saw tooth portion 70.

The second saw tooth portion 70 of the second edge 20 is disposed for mating engagement between the upper guard 66 and the first saw tooth portion 62 of the first edge 22 and the second lower guard portion 68 of the second edge 20 is disposed for mating engagement between the first saw tooth portion 62 and the first lower guard portion 60 of the first edge 22.

In this manner, the first and second saw tooth portions 62 and 70 are protected by both the first and the second lower guard portions 60 and 68, respectively.

The tubular housing 18 can be composed of a moldable, flexible plastic selected from the group consisting of acrylonitrile butadiene styrene, polyvinyl chloride, polyethylene, polypropylene, polytetrafluoroethylene, and polysilicone rubber. The brackets 16 can be composed of stainless steel.

Figure 9:
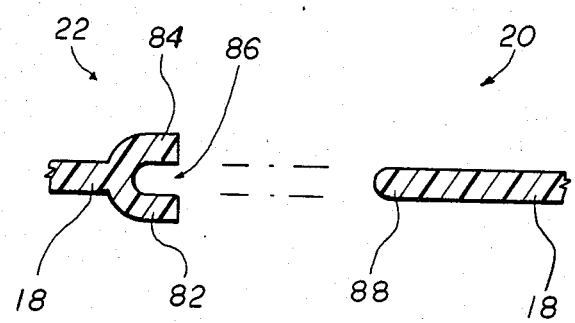
FIG. 9 is a view similar to that in FIG. 6, showing the third embodiment of the closure as a tongue and groove joint.

FIG. 9 shows the tongue and groove feature of the third embodiment of the invention. This embodiment provides for the relatively easy re-entry into the tubular housing 18 after it has been closed. The first longitudinal edge 22 of the pair includes a first groove portion 86 between tines 82 and 84, projecting circumferentially from the wall 18.

The second longitudinal edge 20 of the pair includes a tongue portion 88 projecting circumferentially from the wall 18.

The tongue portion 88 of the second edge 20 is disposed for mating engagement with the groove portion 86 of the first edge 22.

Figure 10:
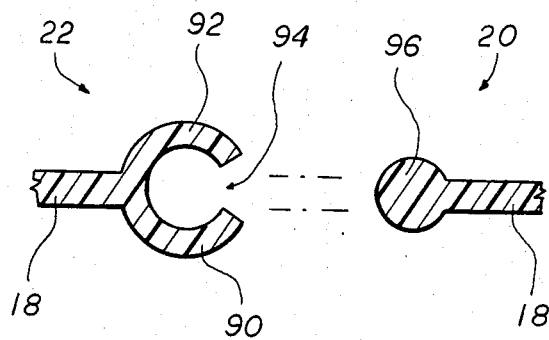
FIG. 10 is a view similar to that in FIG. 6, showing the fourth embodiment of the closure as a ball joint.

FIG. 10 shows the ball joint feature of the fourth embodiment of the invention. This embodiment provides for the relatively easy re-entry into the tubular housing 18 after it has been closed. The first longitudinal edge 22 of the pair includes a groove portion 94 between the tines 90 and 92, having a longitudinally cylindrical hollow shape.

The second longitudinal edge 20 of the pair includes a longitudinal, circularly cylindrical portion 96 projecting circumferentially from the wall 18.

The circularly cylindrical portion 96 of the second edge 20 is disposed for mating engagement with the groove portion 94 of the first edge 22.

Figure 11:
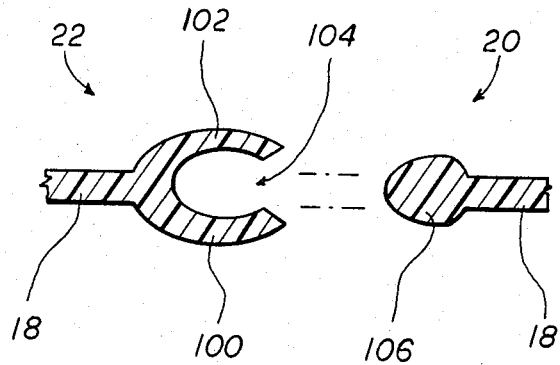
FIG. 11 is a view similar to that in FIG. 6, showing the fifth embodiment of the closure as a modified ball joint.

FIG. 11 shows a fifth embodiment of the invention which features a modified ball joint structure. This embodiment provides for the relatively easy re-entry into the tubular housing 18 after it has been closed. The first longitudinal edge 22 of the pair includes a groove portion 104 between the tines 100 and 102, having a longitudinally cylindrical hollow shape.

The second longitudinal edge 20 of the pair includes a longitudinal, spade-shaped portion 106 projecting circumferentially from the wall 18.

A spade-shaped portion 106 of the second edge is disposed for mating engagement with the groove portion 104 of the first edge 22.

Figure 2:
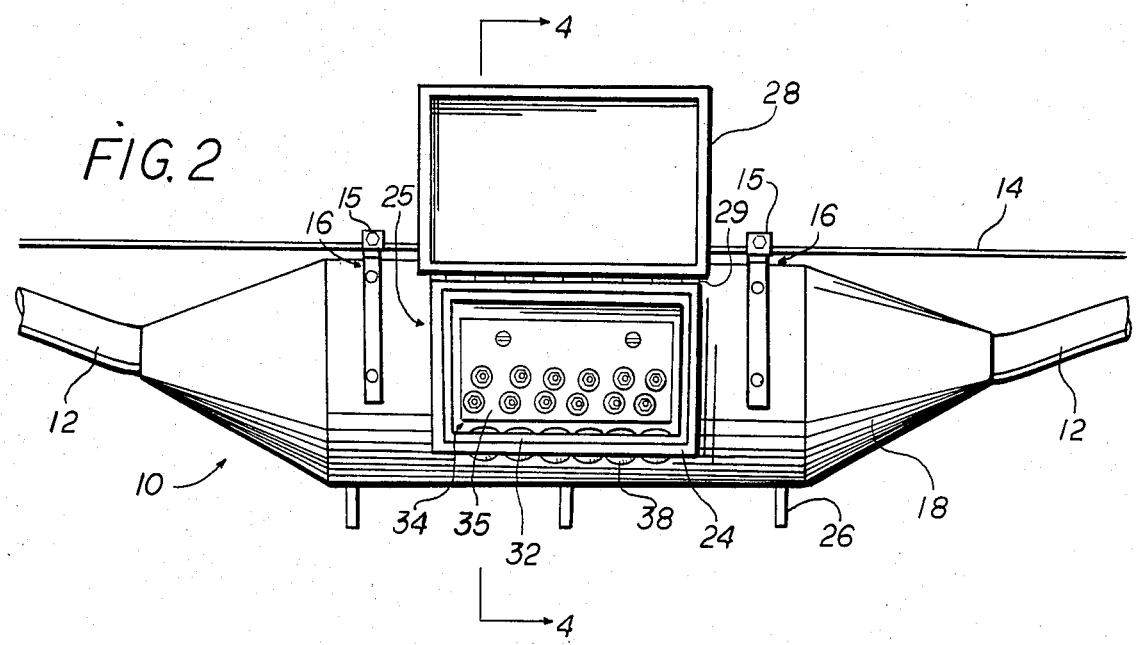
FIG. 2 is a side view of the unitary telephone cable closure of FIG. 1, with the terminal lid in the open position.
Figure 3:
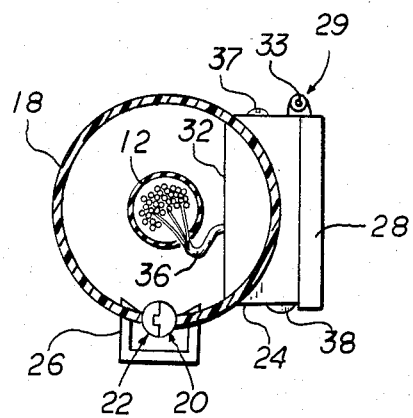
FIG. 3 is a cross sectional view along section line 3—3 of FIG. 1.

In typical applications in the communications industry, the tubular housing can have a diameter of approximately two to five inches and can have a length of approximately twenty to thirty inches. Since the cable 12 must be drawn away from the supporting strand 14 in order to enter the end of the tubular housing 10, shown in FIGS. 1 and 2, it has been found that the resultant transverse force applied to the cable 12 can be minimized by offsetting the position of the cable entrance into the end of the housing 10, making it closer to the supporting strand 14 by a distance of approximately 0.5 inch for example.

When it is desired to terminate some of the conductors in the cable 12 for use with telephone service wires, the closure would include a termination port 25 formed in the side of the tubular housing 18, as shown in FIGS. 1 through 4 and FIG. 12. The termination port 25 includes a rectangular frame 24 formed about a rectangular opening in one side of the tubular housing 18. A replaceable terminal block panel assembly 34 is installed within the rectangular frame 24 and is attached to frame 24 by bolts 37 which extend therethrough to engage with locking nuts 39. The replaceable terminal block assembly is comprised of a terminal block panel 32 on which a terminal block 35 is mounted. A terminal block stub 36 protrudes through an opening in terminal block panel 32. The conductors in the cable 12 are spliced to the terminal block stub 36. The replaceable terminal block assembly 34 can be removed from frame 24 by unbolting the bolts 37 from the locking nuts 39 and disconnecting the terminal block stub 36 from cable 12. The bottom of the terminal block panel 32 and the rectangular frame 24 include a plurality of grommeted openings 38 through which service wires can enter and exit. Service wire hangers 26 are attached to the bottom of tubular housing 18 to provide support for telephone service wires. A hinge 29 is integrally mounted horizontally on a top side of the frame 24. A rectangular lid 28 is pivotally mounted on the hinge 29, for providing access to the terminal block 35. In this manner, the closure can be fastened about the cable and access can be had to terminate telephone service wires to the terminal block 35.

The frame 24 is integrally formed with the tubular housing, for forming a water tight seal therewith. The tubular housing and rectangular frame are composed of a moldable, flexible plastic selected from the group consisting of acrylonitrile butadiene styrene, polyvinyl chloride, polyethylene, polypropylene, polytetrafluoroethylene, and polysilicone rubber.

Figure 4:
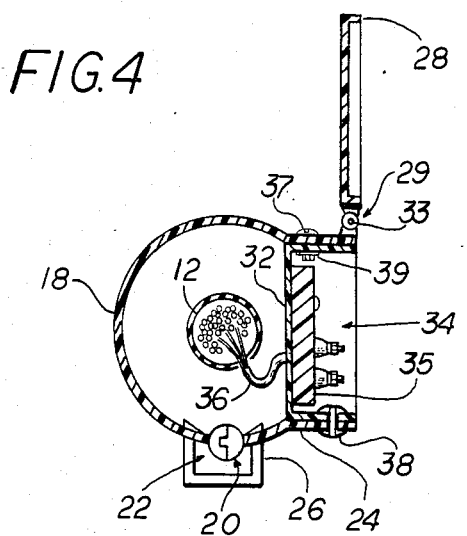
FIG. 4 is a cross sectional view along section line 4—4 of FIG. 2.
Figure 12:
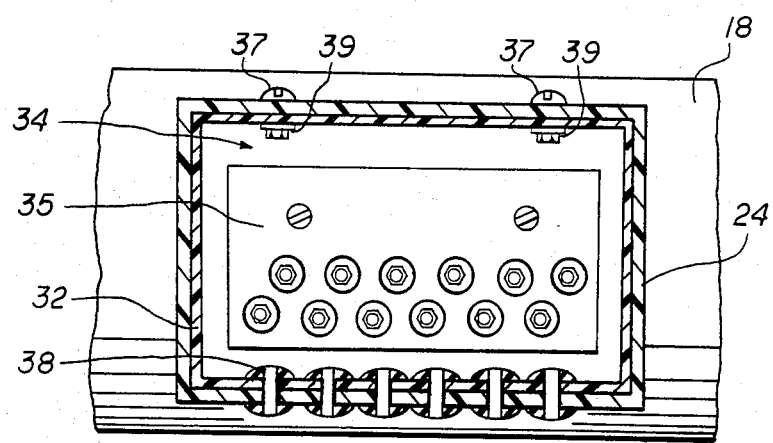
FIG. 12 is a fragmentary sectional view on an enlarged scale taken from FIG. 1.

The lid 28 is mounted on the top of the frame 24, as is seen in FIG. 4, so that it opens outwardly to rest in a vertical, upward orientation on the top of the frame. In this manner, wind force or vibration can close the lid if it is otherwise left unattended.

The lid 28 is mounted to the rectangular frame 24 by means of a stainless steel pin 33, which is mounted in the hinge 29, about which the lid pivots, as is shown in FIG. 4. The hinge 29 is integrally formed with the rectangular frame 24, for forming a unitary structure therewith.

The resultant unitary telephone cable closure invention provides an improved enclosure for the encapsulation of cable splices which is easier to seal than has been available in the prior art. The invention is more impervious to rain water, ultra-violet light and insects than has been available in the prior art. In addition, the invention is more secure against unauthorized entry than has been available in the prior art.

Although specific embodiments of the invention have been disclosed, it will be understood by workers having skill in the art that minor changes can be made to the structure and composition of the invention as disclosed, without departing from the spirit and the scope of the invention.

What is claimed is:

1. A unitary telephone cable closure for enclosing a communications cable suspended from a support strand, comprising:

a hollow, flexible wall, tubular housing having a pair of longitudinal mating edges separated by a longitudinal access slot, said edges being fastenable together in mating engagement after passing a cable through said slot;

a metal hanger bracket having a lower flexible portion fastened to the outside upper circumferential surface of said tubular housing and a vertical portion projecting upwardly, for fastening to a support strand;

a second metal hanger bracket having a lower flexible portion fastened to the outside upper circumferential surface of said tubular housing and a vertical portion projecting upwardly, for fastening to a support strand;

a first longitudinal edge of said pair including a first hook portion projecting circumferentially from said wall and having an upwardly projecting barb, an upper guard portion projecting from said wall and extending above said barb of said hook portion, and a first lower guard portion projecting from said wall and extending below said hook portion;

a second longitudinal edge of said pair including a second hook portion projecting circumferentially from said wall and having a downwardly projecting barb and a second lower guard portion projecting from said wall and extending below said second hook portion;

said second hook portion of said second edge disposed for mating engagement between said upper guard portion and said first hook portion of said first edge, and said second lower guard portion of said second edge disposed for mating engagement between said first hook portion and said first lower guard portion of said first edge;

whereby said first and second hook portions are protected by both said first and said second lower guard portions;

whereby said closure can be fastened about a cable.

2. A unitary telephone cable closure for enclosing a communications cable suspended from a support strand, comprising:

a hollow, flexible wall, tubular housing having a pair of longitudinal mating edges separated by a longitudinal access slot, said edges being fastenable together in mating engagement after passing a cable through said slot;

a metal hanger bracket having a lower flexible portion fastened to the outside upper circumferential surface of said tubular housing and a vertical portion projecting upwardly, for fastening to a support strand;

a second metal hanger bracket having a lower flexible portion fastened to the outside upper circumferential surface of said tubular housing and a vertical portion projecting upwardly, for fastening to a support strand;

a first longitudinal edge of said pair including a first saw tooth portion projecting circumferentially from said wall and having an upwardly projecting serrated surface, an upper guard portion projecting from said wall and extending above said serrated surface of said saw tooth portion, and a first lower guard portion projecting from said wall and extending below said saw tooth portion;

a second longitudinal edge of said pair including a second saw tooth portion projecting circumferentially from said wall and having a downwardly projecting serrated surface and a second lower guard portion projecting from said wall and extending below said second saw tooth portion;

said second saw tooth portion of said second edge disposed for mating engagement between said upper guard portion and said first saw tooth portion of said first edge, and said second lower guard portion of said second edge disposed for mating engagement between said first saw tooth portion and said first lower guard portion of said first edge;

whereby said first and second saw tooth portions are protected by both said first and said second lower guard portions;

whereby said closure can be fastened about a cable.

3. A unitary telephone cable closure for enclosing a communications cable suspended from a support strand, comprising:

a hollow, flexible wall, tubular housing having a pair of longitudinal mating edges separated by a longitudinal access slot, said edges being fastenable together in mating engagement after passing a cable through said slot;

a metal hanger bracket having a lower flexible portion fastened to the outside upper circumferential surface of said tubular housing and a vertical portion projecting upwardly, for fastening to a support strand;

a second metal hanger bracket having a lower flexible portion fastened to the outside upper circumferential surface of said tubular housing and a vertical portion projecting upwardly, for fastening to a support strand;

a first longitudinal edge of said pair including a first groove portion projecting circumferentially from said wall;

a second longitudinal edge of said pair including a tongue portion projecting circumferentially from said wall;

said tongue portion of said second edge disposed for mating engagement with said groove portion of said first edge;

whereby said closure can be fastened about a cable.

4. A unitary telephone cable closure for enclosing a communications cable suspended from a support strand, comprising:

a hollow, flexible wall, tubular housing having a pair of longitudinal mating edges separated by a longitudinal access slot, said edges being fastenable together in mating engagement after passing a cable through said slot;

a metal hanger bracket having a lower flexible portion fastened to the outside upper circumferential surface of said tubular housing and a vertical portion projecting upwardly, for fastening to a support strand;

a second metal hanger bracket having a lower flexible portion fastened to the outside upper circumferential surface of said tubular housing and a vertical portion projecting upwardly, for fastening to a support strand;

a first longitudinal edge of said pair including a groove portion having a longitudinally cylindrical hollow shape;

a second longitudinal edge of said pair including a longitudinal circularly cylindrical portion projecting circumferentially from said wall;

said circularly cylindrical portion of said second edge disposed for mating engagement with said groove portion of said first edge;

whereby said closure can be fastened about a cable.

5. A unitary telephone cable closure for enclosing a communications cable suspended from a support strand, comprising:

a hollow, flexible wall, tubular housing having a pair of longitudinal mating edges separated by a longitudinal access slot, said edges being fastenable together in mating engagement after passing a cable through said slot;

a metal hanger bracket having a lower flexible portion fastened to the outside upper circumferential surface of said tubular housing and a vertical portion projecting upwardly, for fastening to a support strand;

a second metal hanger bracket having a lower flexible portion fastened to the outside upper circumferential surface of said tubular housing and a vertical portion projecting upwardly, for fastening to a support strand;

a first longitudinal edge of said pair including a groove portion having a longitudinally cylindrical hollow shape;

a second longitudinal edge of said pair including a longitudinal, spade-shaped portion projecting circumferentially from said wall;

said spade-shaped portion of said second edge disposed for mating engagement with said groove portion of said first edge;

whereby said closure can be fastened about a cable.

6. A unitary telephone cable closure for enclosing a communications cable suspended from a support strand, comprising:

a hollow, flexible wall, tubular housing having a pair of longitudinal mating edges separated by a longitudinal access slot, said edges being fastenable together in mating engagement after passing a cable through said slot;

a metal hanger bracket having a lower flexible portion fastened to the outside upper circumferential surface of said tubular housing and a vertical portion projecting upwardly, for fastening to a support strand;

a second metal hanger bracket having a lower flexible portion fastened to the outside upper circumferential surface of said tubular housing and a vertical portion projecting upwardly, for fastening to a support strand;

a rectangular frame formed about a rectangular opening in one side of said tubular housing between said first and said second metal brackets;

a terminal block panel assembly attached within said rectangular frame and being comprised of a terminal block panel on which a terminal block is mounted;

a hinge mounted horizontally on a top side of said frame;

a rectangular lid pivotally mounted on said hinge, for providing access to said terminal block;

whereby said closure can be fastened about a cable and access can be had to terminate portions of a cable through said rectangular opening.

7. The apparatus of claim 6, wherein said frame is integrally formed with said tubular housing, for forming a water tight seal therewith.

8. The apparatus of claim 6, wherein said lid opens outwardly to rest in a vertical, upward orientation on the top of said frame;

whereby wind force or vibration can close said lid if otherwise left unattended.

9. The apparatus of claim 6, wherein said lid is mounted to said rectangular frame by means of a stainless steel pin mounted in said hinge, about which said lid pivots.

10. The apparatus of claim 6, wherein said hinge is integrally formed with said rectangular frame, for forming a unitary structure therewith.

* * * * *